United States Patent
Kapil et al.

(10) Patent No.: US 9,817,762 B2
(45) Date of Patent: Nov. 14, 2017

(54) FACILITATING EFFICIENT PREFETCHING FOR SCATTER/GATHER OPERATIONS

(71) Applicant: Oracle International Corporation, Redwood City, CA (US)

(72) Inventors: Sanjiv Kapil, Cupertino, CA (US); Darryl J. Gove, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 275 days.

(21) Appl. No.: 14/282,771

(22) Filed: May 20, 2014

(65) Prior Publication Data

US 2015/0339233 A1 Nov. 26, 2015

(51) Int. Cl.
*G06F 12/0862* (2016.01)
*G06F 12/1027* (2016.01)
(Continued)

(52) U.S. Cl.
CPC .......... *G06F 12/0862* (2013.01); *G06F 12/08* (2013.01); *G06F 12/10* (2013.01);
(Continued)

(58) Field of Classification Search
CPC ........... G06F 2212/68; G06F 2212/684; G06F 12/1045; G06F 12/1072; G06F 2212/602;
(Continued)

(56) References Cited

U.S. PATENT DOCUMENTS

| | | | | |
|---|---|---|---|---|
| 5,835,964 A | * | 11/1998 | Draves | G06F 12/1036 |
| | | | | 711/207 |
| 5,895,501 A | * | 4/1999 | Smith | G06F 12/1027 |
| | | | | 711/128 |

(Continued)

OTHER PUBLICATIONS

Arpaci-Dusseau, R.H., Arpaci-Dusseau, A.C., "Operating Systems: Three Easy Pieces", Arpaci-Dusseau Books, Feb. 2014 Version 0.7, Ch. 4, pp. 2-3, Ch. 19, pp. 1-2, 5.*

(Continued)

*Primary Examiner* — Reginald Bragdon
*Assistant Examiner* — Aaron D Ho
(74) *Attorney, Agent, or Firm* — Park, Vaughan, Fleming & Dowler LLP

(57) ABSTRACT

The disclosed embodiments relate to a computing system that facilitates performing prefetching for scatter/gather operations. During operation, the system receives a scatter/gather prefetch instruction at a processor core, wherein the scatter/gather prefetch instruction specifies a virtual base address, and a plurality of offsets. Next, the system performs a lookup in a translation-lookaside buffer (TLB) using the virtual base address to obtain a physical base address that identifies a physical page for the base address. The system then sends the physical base address and the plurality of offsets to a cache. This enables the cache to perform prefetching operations for the scatter/gather instruction by adding the physical base address to the plurality of offsets to produce a plurality of physical addresses, and then prefetching cache lines for the plurality of physical addresses into the cache.

16 Claims, 4 Drawing Sheets

(51) Int. Cl.
*G06F 12/08* (2016.01)
*G06F 12/10* (2016.01)

(52) U.S. Cl.
CPC .. *G06F 12/1027* (2013.01); *G06F 2212/6028* (2013.01); *G06F 2212/681* (2013.01)

(58) Field of Classification Search
CPC ............... G06F 2212/681; G06F 12/08; G06F 12/0862; G06F 12/10; G06F 12/1027; G06F 2212/30; G06F 2212/301; G06F 2212/454; G06F 9/30036
USPC ................... 711/137; 712/2, 3, 4, 5, 6, 7, 22
See application file for complete search history.

(56) References Cited

U.S. PATENT DOCUMENTS

| | | | |
|---|---|---|---|
| 6,513,107 B1* | 1/2003 | Ansari | G06F 9/30043 712/4 |
| 7,383,402 B2 | 6/2008 | Kalogeropulos et al. | |
| 8,135,915 B2 | 3/2012 | Dimpsey et al. | |
| 8,161,265 B2 | 4/2012 | Arimilli et al. | |
| 8,892,848 B2* | 11/2014 | Sprangle | G06F 9/30043 712/225 |
| 2008/0127131 A1 | 5/2008 | Gao et al. | |
| 2009/0198909 A1* | 8/2009 | Speight | G06F 12/0862 711/137 |
| 2011/0264863 A1* | 10/2011 | Sprangle | G06F 9/30043 711/125 |
| 2012/0072672 A1 | 3/2012 | Anderson et al. | |
| 2012/0144089 A1* | 6/2012 | Hall | G06F 12/08 711/3 |
| 2013/0138887 A1* | 5/2013 | Chou | G06F 12/0862 711/122 |
| 2014/0237303 A1* | 8/2014 | Bharadwaj | G06F 9/30018 714/48 |
| 2015/0278099 A1* | 10/2015 | Jain | G06F 12/0862 711/137 |

OTHER PUBLICATIONS

R. Heald et al., "64-KByte sum-addressed-memory cache with 1.6-ns cycle and 2.6-ns latency," in IEEE Journal of Solid-State Circuits, vol. 33, No. 11, pp. 1682-1689, Nov. 1998.*
R. Fu et al., "Reducing Queueing Stalls Caused by Data Prefetching", The 11th Annual Workshop on the Interaction between Compilers and Computer Architecture, 2007.*
Lametti, S., "Cache Coherence Techniques", Technical Report, University of Pisa, Dec. 2010, pp. 6-12.*
Sun Microsystems, "UltraSPARC® IIIi Processor User's Manual" Version 1.0, Jun. 2003, pp. 274-278.*
W. L. Lynch, G. Lautterbach and J. I. Chamdani, "Low load latency through sum-addressed memory (SAM)," Computer Architecture, 1998. Proceedings. The 25th Annual International Symposium on, Barcelona, 1998, pp. 369-379.*

* cited by examiner

FACILITATING EFFICIENT PREFETCHING FOR SCATTER/GATHER OPERATIONS

BACKGROUND

Field

The disclosed embodiments generally relate to techniques for improving the performance of computer systems. More specifically, the disclosed embodiments relate to the design of a processor, which includes a mechanism to facilitate efficient prefetching for scatter/gather operations.

Related Art

As the gap between processor speeds and memory performance continues to grow, prefetching is becoming an increasingly important technique for improving computer system performance. Prefetching involves retrieving cache lines from memory and placing them in cache before the cache lines are actually accessed by an application. This prevents the application from having to wait for a cache line to be retrieved from memory and thereby improves computer system performance.

Prefetching tends to work well for workloads that exhibit predictable access patterns. For these applications stride-based prefetching techniques can typically be used to predict which data items will be accessed next. However, other types of applications, for example applications associated with database operations, perform scatter/gather type memory operations that do not exhibit such predictable access patterns, and require the computing system to follow pointers to access relevant data items. (These scatter/gather memory operations are also referred to as "vector-indirect memory operations," and the associated prefetching instructions are referred to as "vector-indirect prefetch instructions" in this specification and the appended claims.)

Prefetching can also be used to improve the performance of these scatter/gather operations. However, performing prefetching for scatter/gather operations involves performing a large number of lookups in a translation-lookaside buffer (TLB) to translate virtual addresses into corresponding physical addresses. This can potentially create performance problems because performing numerous TLB lookups for prefetching operations can interfere with other non-prefetch-related accesses to the TLB. Moreover, many TLB lookups for scatter/gather operations are unnecessary because target operands for scatter/gather operations tend to be located on the same virtual memory page, so many of these TLB lookups will simply access the same TLB entry.

Hence, what is needed is a technique for facilitating prefetching operations for scatter/gather operations without performing unnecessary TLB accesses.

SUMMARY

The disclosed embodiments relate to a computing system that facilitates performing prefetching for scatter/gather operations. During operation, the system receives a scatter/gather prefetch instruction at a processor core, wherein the scatter/gather prefetch instruction specifies a virtual base address, and a plurality of offsets. Next, the system performs a lookup in a translation-lookaside buffer (TLB) using the virtual base address to obtain a physical base address that identifies a physical page for the base address. The system then sends the physical base address and the plurality of offsets to a cache. This enables the cache to perform prefetching operations for the scatter/gather instruction by adding the physical base address to the plurality of offsets to produce a plurality of physical addresses, and then prefetching cache lines for the plurality of physical addresses into the cache.

In some embodiments, if a physical address in the plurality of physical addresses does not fall within the physical page associated with the base address, no prefetching operation is performed for the physical address.

In some embodiments, if the scatter/gather prefetch instruction is a scatter prefetch instruction, the cache lines are prefetched into the cache in a modifiable state.

In some embodiments, if a prefetch operation causes a cache miss, and an associated miss buffer for the cache is full, the prefetch operation is dropped.

In some embodiments, if the TLB lookup causes a TLB miss, the system uses a hardware table walker to retrieve an associated page table entry for the virtual base address into the TLB, and then replays the scatter/gather prefetch instruction.

In some embodiments, the scatter/gather prefetch instruction identifies: a first register associated with the virtual base address; and a second register containing the plurality of offsets.

In some embodiments, the scatter/gather prefetch instruction is implemented as a modification of a block store instruction, wherein the first register, which is normally used to identify a store target location, is repurposed to identify the virtual base address, and wherein the second register, which normally holds a block of data to be stored, is repurposed to hold the plurality of offsets.

In some embodiments, the cache is one of a Level 2 (L2) cache or a Level 3 (L3) cache. Note that the scatter/gather prefetching operations are not restricted to being performed at the L2 cache, L3 cache or memory associated with the local processor core. This scatter/gather prefetching can generally be performed at any location in a cache-coherent SMP memory system. Hence, the prefetching may be performed at a local L2 cache, a local L3 cache, a local memory, a remote socket cache, or a remote socket memory depending upon where the address space of the prefetch maps into.

DETAILED DESCRIPTION

Figure 1:
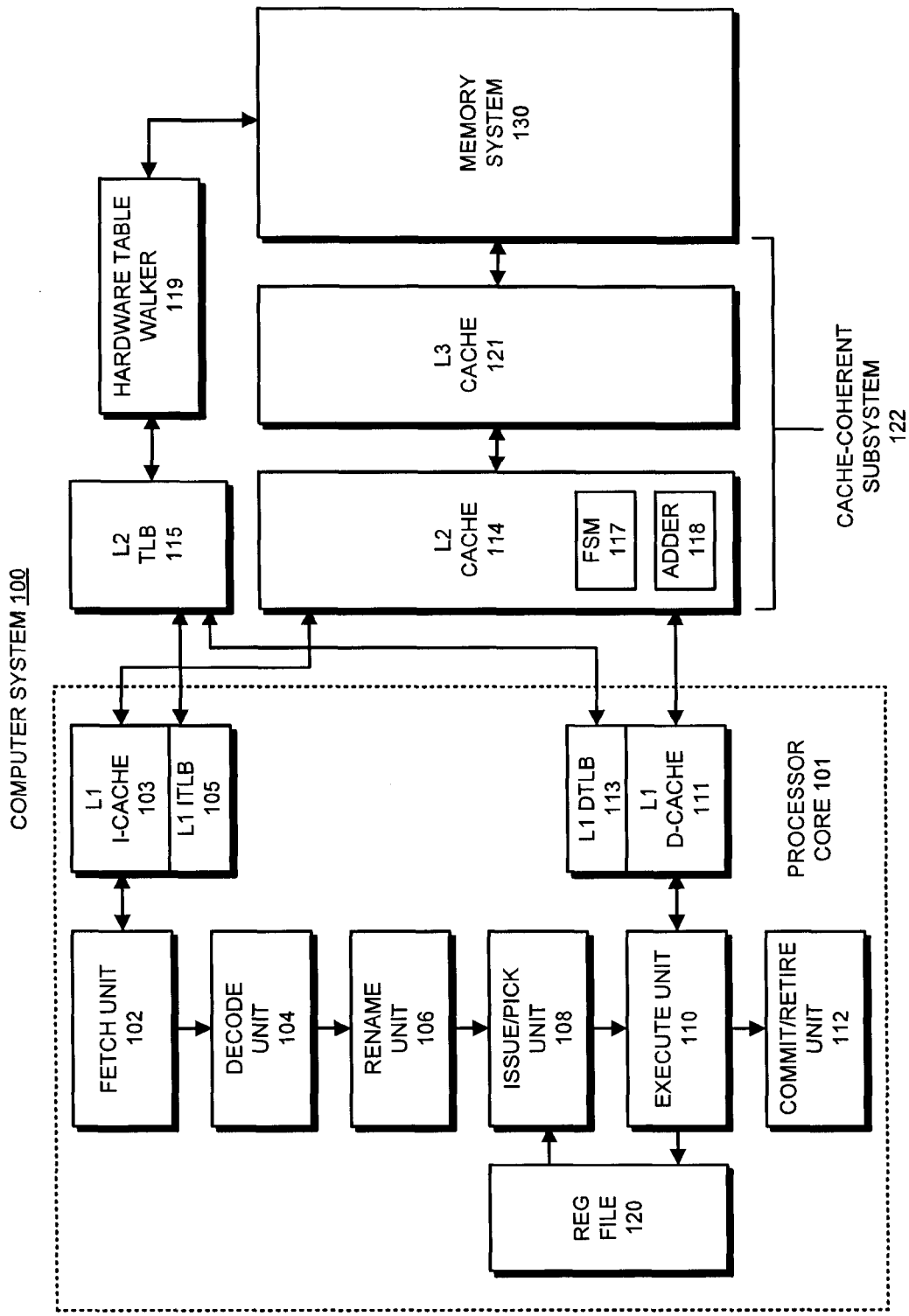
FIG. 1 illustrates a computer system in accordance with disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, the disclosed embodiments relate to a computer processor that facilitates performing scatter/gather prefetching operations. Instead of sending a separate prefetch instruction for each memory reference, the processor issues a single scatter/gather prefetch instruction which causes the L2 cache to issue prefetches for a set of offsets from a virtual base address. This single instruction only requires a single translation-lookaside buffer (TLB) lookup to convert the virtual base address into a physical base address and then adds the offsets to this physical base address. This technique eliminates a large number of unnecessary TLB lookups because the ultimate target memory locations for scatter/gather operations tend to fall on the same physical page in memory. This means that most of the TLB lookups for scatter/gather prefetch operations tend to return the same physical page address and are hence redundant.

However, accesses for other offsets that fall outside of the physical page for the base address are dropped. In practice, this is relatively uncommon because page sizes tend to be relatively large (at least 4 megabytes), so it is quite likely that most target memory locations for a scatter or gather operation will fall within the same page. This technique becomes even more effective as address spaces for applications become increasingly large and page sizes continue to increase.

Note that page sizes were historically much smaller (e.g., 4K or 8K) and a major motivation for paging was to store portions of the virtual address space on disk. Note that it takes too much time to retrieve a large page (e.g., 4 megabytes) from disk. However, as memory continues to become cheaper and more plentiful and as processor speeds continue to increase, virtual memory systems are rarely being used to swap pages out to disk. At present, the main motivation for using virtual memory is to allow applications to run in their own address spaces, which can be located anywhere in physical memory. Also, virtual memory systems enable processes and associated applications to share memory segments. This change in motivation has caused page sizes to increase dramatically from several kilobytes to several megabytes (and even conceivably gigabytes).

Before we describe how this technique operates, we first describe the structure of a processor that implements this technique.

Computer System

FIG. 1 illustrates a computer system 100 in accordance with the described embodiments. Computer system 100 can include any type of general-purpose or special-purpose computer system, including, but not limited to, a server, a desktop computer, a digital signal processor, a laptop computer, a notebook computer, a tablet computer, a personal digital assistant, a cell phone, a device controller, or a computational engine within an appliance. Computer system 100 includes a processor core 101, an L2 TLB 115, an L2 cache 114, L3 cache 121 and a memory system 130. Note that memory system 130 can include a main memory and possibly an L4 cache. Also note that L2 cache 114, an L3 cache 121, a memory system 130 and possibly other caches and memories (which are not shown) can collectively form a cache-coherent subsystem 122, wherein different copies of the same cache line are kept coherent with each other. Moreover, although we describe the prefetching as being initiated at the L2 cache, in general the prefetching can be initiated at any location in cache-coherent subsystem 122, and the prefetched cache lines can be stored at any location within cache-coherent subsystem 122.

Processor core 101 includes an execution pipeline comprising a fetch unit 102, a decode unit 104, a rename unit 106, an issue/pick unit 108, an execute unit 110 and a commit/retire unit 112. During program execution, fetch unit 102 retrieves an instruction from level-one (L1) instruction cache (I-cache) 103. Note that this instruction retrieval operation can involve performing an initial lookup in L1 instruction TLB (ITLB) 105 to obtain a virtual-to-physical address translation.

The retrieved instruction feeds through decode unit 104, which decodes the instruction, and then through rename unit 106, which performs register-renaming operations to identify the relevant operands for the instruction. Next, the decoded instruction feeds into issue/pick unit 108, which selects an instruction with valid source operands to be executed. The selected instruction feeds into execute unit 110, which executes the instruction, wherein the execution can involve accessing data stored in L1 data cache (D-cache) 111 and accessing data stored in register file 120. Note that this data-access operation can involve performing an initial lookup in L1 data TLB (DTLB) 113 to obtain a virtual-to-physical address translation. During operation, issue/pick unit 108 and execute unit 110 both access operands stored in register file 120.

At the end of the execution pipeline, the instruction feeds into commit/retire unit 112, which commits results produced during execution of the instruction.

Note that L1 I-cache 103 and L1 D-cache 111 both access a unified L2 cache 114, which stores both instruction cache lines and data cache lines. L2 cache 114, in turn, communicates with memory system 130. Similarly, L1 ITLB 105 and L1 DTLB 113 both access a lower-level L2 TLB 115, which stores page table entries that were retrieved from memory system 130 by a hardware table walker 119.

Also note that L2 cache 114 includes the finite-state machine (FSM) 117 and an adder circuit 118, which are used by the L2 cache 114 to facilitate performing scatter/gather prefetch operations. FSM 117 is used to control the process of adding offsets to a physical base address to generate a physical address for the prefetching operations as is described in more detail below.

Scatter/Gather Prefetch Instruction

Figure 2:
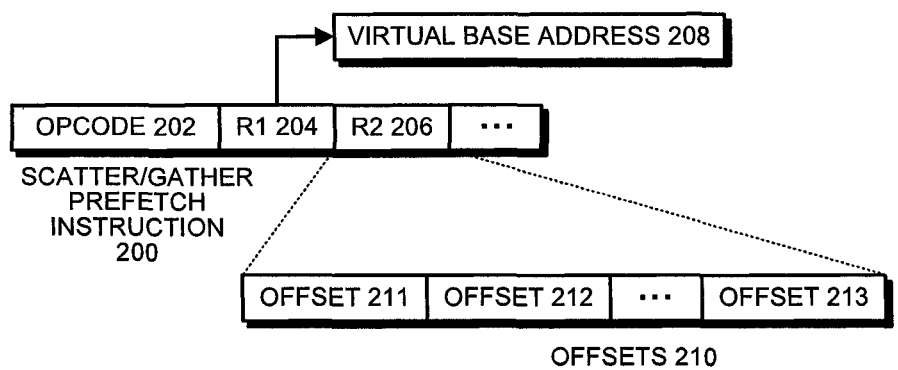
FIG. 2 illustrates the format of a scatter/gather prefetch instruction in accordance with the disclosed embodiments.

FIG. 2 illustrates the format of a scatter/gather prefetch instruction 200 in accordance with the disclosed embodiments. There are two variations of this scatter/gather prefetch instruction. The first variation is a "scatter prefetch instruction," which performs prefetching for a subsequent scatter operation that writes data values to locations specified by an array of addresses. The second variation is a "gather prefetch instruction," which performs prefetching for a gather operation that reads data values from locations specified by an associated array of addresses.

The "scatter" and "gather" variations of the prefetching operation operate in essentially the same way, except that the scatter variation loads cache lines into the L2 cache in a modifiable state, whereas the gather variation is only required to load cache lines into the L2 cache in a readable state. More specifically, assume that the L2 cache implements a variation of the MOESI cache-coherence protocol. The MOESI cache-coherence protocol allows a cache line to exist in one of five states, including: (1) a modified state (M), which indicates that the cache contains the only valid copy of the cache line which has been modified; (2) an owned state (O), which indicates that the cache is one of several with a valid copy of the cache line, but has the exclusive right to make changes to it; (3) an exclusive state (E), which indicates that the cache has the only copy of the line, but the line is unmodified; (4) a shared state (S), which indicates that the line is one of several copies in the system, but the cache does not have permission to modify the line; and (5) an invalid state (I), which indicates that the cache line is invalid. If the L2 cache implements a MOESI cache-coherence protocol, during a scatter prefetch operation, the system can load cache lines into the L2 cache in the M, O and E states, but not the S or I states. In contrast, during a gather prefetch operation, the system can load the cache lines into the cache in the S state and possibly the M, O and E states, but not the I state.

Referring to FIG. 2, scatter/gather prefetch instruction 200 includes a number of fields, including an operation code (opcode) field 202, a first register index field R1 204 and a second register index field R2 206. The opcode field 202 identifies the instruction as either a scatter prefetch instruction or a gather prefetch instruction. The first register index field R1 204 indexes a register that contains a virtual base address 208 for the scatter/gather prefetch operation. The second register index field R2 206 holds a plurality of offsets 210 for the scatter/gather prefetch instruction, including offsets 211-213. For example, the block of memory can comprise 64 bytes that contains 16 4-byte offsets for the scatter/gather prefetching operation. (Note that the second register index field R2 206 can alternatively point to a block of memory that holds the plurality of offsets 210.)

Although the scatter/gather prefetch instruction 200 illustrated in FIG. 2 uses specific addressing modes to access virtual base address 208 and offsets 210, the disclosed embodiments can generally use any type of addressing mode, including immediate, direct and register indirect addressing modes. Moreover, the addresses can be absolute addresses or program-counter-relative addresses.

In some embodiments, the scatter/gather prefetch instruction is implemented as a modification of a block store instruction. This modification involves changing the opcode field of the block store instruction (or possibly another field in the block store instruction) to indicate that the instruction is a scatter prefetch instruction or a gather prefetch instruction. It also involves repurposing a first register, which is used by the block store instruction to identify a store target location, to identify the virtual base address. It additionally involves repurposing a second register, which is used by the block store instruction to hold a block of data to be stored, to hold the plurality of offsets for the scatter/gather prefetch operation. With a block store instruction, we can actually use eight 8-byte registers to store an entire cache line of data at the same time. Hence, if we modify a block store instruction to implement a scatter/gather prefetch, we can store eight 64-bit offsets in the registers, or 16 32-bit offsets, or 32 16-bit offsets.

More specifically, the base address, which is sent as part of the block store instruction, is used to perform a TLB lookup to obtain a corresponding physical address. The cache infers that this physical address is the base address for the scatter/gather operations, and latches it in a base address register. All subsequent offsets that arrive as part of the block store instruction are added to this base address register to form separate physical addresses. At this point, the system can combine addresses in situations where two or more offsets fall within the same cache line. The system can then initiate the prefetch from the cache, which can possibly map to the same or separate cache lines but reside within a single page. Note that prefetches happen on a cache line basis, so if two or more offsets fall within the same cache line, only a single prefetch needs to be issued from the cache to the memory subsystem to acquire this cache line.

Some variations of the scatter/gather instruction use an "allocation flag" that specifies an allocation of the prefetch data into one or more destination locations. For example, this allocation flag can be specified as, "scatter/gather_Instr[.]alloc_flag"

where alloc_flag.L2/L3/[L2,L3], for example, in the case where a three-level hierarchy is supported. In this example, it is possible to initiate the prefetch from the L2 cache and allocate the prefetch data into both the L2 and L3 caches, or alternatively into only the L2 cache, or only the L3 cache as indicated by the allocation flag.

Executing a Scatter/Gather Prefetch Instruction at the Processor Core

Figure 3:
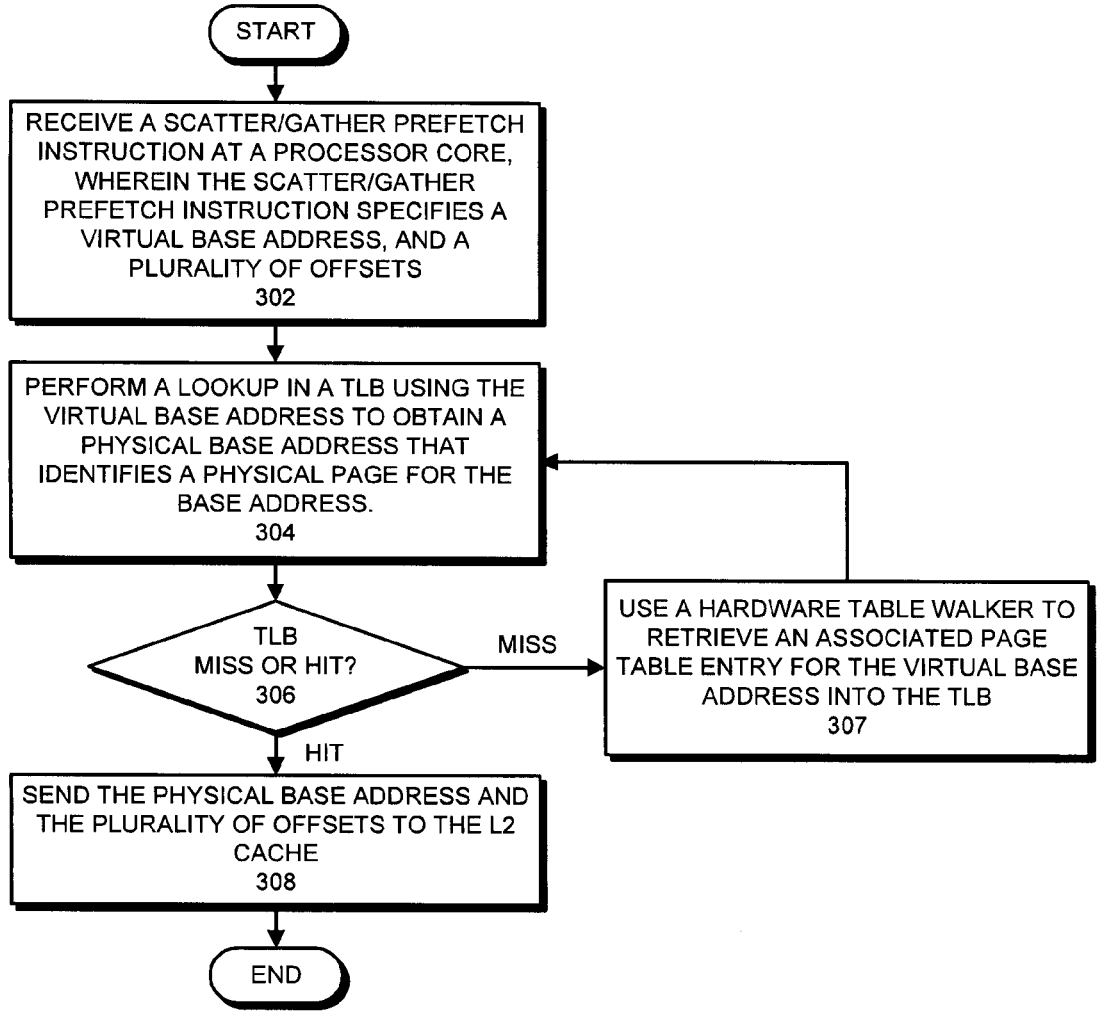
FIG. 3 presents a flow chart illustrating how a scatter/gather prefetch instruction is executed at a processor core in accordance with the disclosed embodiments.

FIG. 3 presents a flow chart illustrating how a scatter/gather prefetch instruction is executed at a processor core in accordance with the disclosed embodiments. During operation, the system receives a scatter/gather prefetch instruction at a processor core, wherein the scatter/gather prefetch instruction specifies a virtual base address, and a plurality of offsets (step 302). Next, the system performs a lookup in a translation-lookaside buffer (TLB) using the virtual base address to obtain a physical base address that identifies a physical page for the base address (step 304). The system then determines whether the TLB lookup causes a TLB miss or a TLB hit (step 306). If the TLB lookup causes a TLB miss at step 306, the system uses a hardware table walker to retrieve an associated page table entry for the virtual base address into the TLB (step 307) and then returns to step 304 to replay the scatter/gather prefetch instruction.

On the other hand, if the TLB lookup generated a TLB hit at step 306, the processor core sends the physical base address and the plurality of offsets to the L2 cache (step 308).

Executing a Scatter/Gather Prefetch Instruction at the L2 Cache

Figure 4:
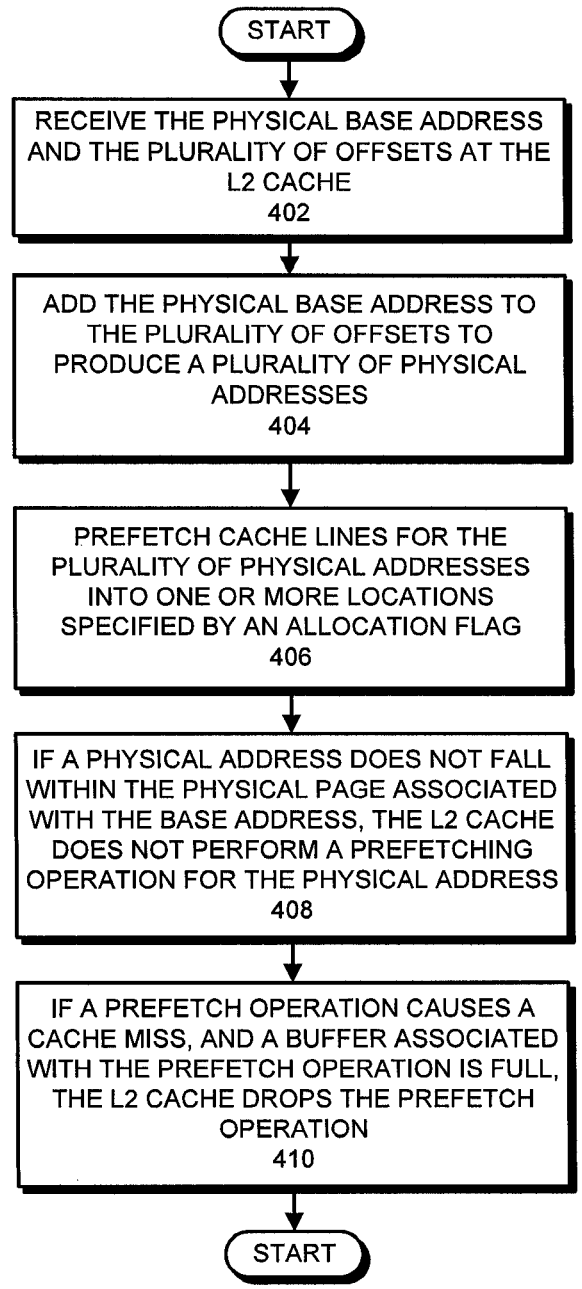
FIG. 4 presents a flow chart illustrating how a scatter/gather prefetch instruction is executed at an L2 cache in accordance with the disclosed embodiments.

FIG. 4 presents a flow chart illustrating how a scatter/gather prefetch instruction is executed at an L2 cache in accordance with the disclosed embodiments. (Although, as mentioned above, prefetching generally can be initiated from any location in the cache-coherent subsystem including the L2, L3 and L4 caches.) At the start of this process, the L2 cache receives the physical base address and the plurality of offsets for the processor core (step 402). Next, the L2 cache adds the physical base address to the plurality of offsets to produce a plurality of physical addresses (step 404), and then prefetches cache lines for the plurality of physical addresses into one or more locations specified by an allocation flag as mentioned above (step 406). Note that these operations take place under control of FSM 117, which cycles through all of the offsets and performs the addition operations to generate a set of physical addresses using adder 118, and then generates prefetches for the generated physical addresses (see FIG. 1). Also note that after adding the physical base address to the offsets to produce the physical addresses in step 404 above, the L2 cache's FSM 117 only prefetches those physical addresses that cause misses in the L2 cache. In this way, FSM 117 effectively filters out unnecessary prefetches.

During the above-described processes in steps 404 and 406, if a physical address does not fall within the physical page associated with the base address, the L2 cache does not perform a prefetching operation for the physical address (step 408). Also, if a prefetch operation causes a cache miss, and a buffer associated with the prefetch operation is full, the L2 cache drops the prefetch operation (step 410).

Compiler Modifications to Facilitate Scatter/Gather Prefetch Operations

The above-described scatter/gather prefetch instructions are generated by a compiler in response to detecting a set of indirect memory references in an application's execution stream. These indirect memory references can be associated with explicit "scatter" and "gather" instructions, in which case it is a simple matter to convert the pointer arrays for the scatter and gather operations into offsets relative to a virtual base address.

In other cases, the compiler detects a set of upcoming indirect or randomized accesses in the application's instruction stream and then generates scatter or gather prefetching operations for these accesses. For example, if the application performs a set of hash table lookups and the corresponding set of hash values are computed ahead of time, the compiler can generate code to convert the hash values into offsets from a virtual base address for the start of the hash table. In another example, a database operation, such as a "join," may cause a large number of data values to be accessed in a predictable pattern that becomes apparent at run time. In this case, a set of data accesses for a join operation can be prefetched by converting the data accesses into a virtual base address and a set of associated offsets, and then using the virtual base address and offsets to generate a scatter/gather prefetch instruction for the set of accesses.

Extensions

Instead of prefetching into the L2 cache, the system can alternatively prefetch into other locations in the memory hierarchy to avoid cache-pollution problems due to a small L2 cache size. This can be accomplished by physically locating the prefetching circuitry (including the FSM) at other locations in the memory hierarchy, such as at the L3 cache, which could send out prefetches to more-remote levels of the memory hierarchy. Although note that the hit/miss determinations for loads and stores associated with scatter/gather operations still need to be performed at every cache in the memory hierarchy, including at the L2 cache.

Also note that the allocation flag discussed above can similarly be used to direct prefetches to one or more other locations in the memory hierarchy.

The above-described technique can also be applied to improve the performance for actual "scatter" and "gather" instructions as long as the target addresses for the scatter and gather operations all fall within the same physical page. (This may be practical for a scatter or gather operation for a hash table that fits entirely within a single physical page.)

It is also possible to implement a scatter/gather prefetch operation that simply generates prefetches for an array of pointers which do not fall within the same physical page, and which are not associated with offsets from the same virtual base address. In this case, each prefetch will require a separate TLB lookup. However, the executable code will be more compact because a large number of prefetching instructions are compacted into each scatter/gather prefetching instruction.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating prefetching for vector-indirect memory operations, comprising:
    receiving a vector-indirect prefetch instruction at a processor core, wherein the vector-indirect prefetch instruction specifies a virtual base address, and a plurality of offsets;
    performing a single lookup in a translation-lookaside buffer (TLB) using the virtual base address to obtain a physical base address that identifies a physical page for the virtual base address;
    sending the physical base address and the plurality of offsets to a cache; and
    at the cache, performing prefetching operations for the vector-indirect prefetch instruction by,
        adding the physical base address from the single lookup to the plurality of offsets to produce a plurality of physical addresses,
        for each physical address in the plurality of physical addresses that fall within the physical page, prefetching cache lines for the plurality of physical addresses into the cache, and
        for each physical address in the plurality of physical addresses that fall outside of the physical page, no prefetching operation is performed.

2. The method of claim 1, wherein producing the plurality of physical addresses includes combining physical addresses when two or more associated offsets fall within a single cache line.

3. The method of claim 1, wherein if the vector-indirect prefetch instruction is a scatter prefetch instruction, the cache lines are prefetched into the cache in a modifiable state.

4. The method of claim 1, wherein if a vector/indirect prefetch instruction causes a cache miss, and a buffer associated with the vector-indirect prefetch instruction is full, the vector-indirect prefetch instruction is dropped.

5. The method of claim 1, wherein if the TLB lookup causes a TLB miss, the method further comprises:

using a hardware table walker to retrieve an associated page table entry for the virtual base address into the TLB; and replaying the vector-indirect prefetch instruction.

6. The method of claim 1, wherein the vector-indirect prefetch instruction identifies:
a first register associated with the virtual base address; and
a second register that contains a pointer to a block of memory containing the plurality of offsets.

7. The method of claim 1, wherein the vector-indirect prefetch instruction identifies:
a first register associated with the virtual base address; and
one or more second registers that contain the plurality of offsets.

8. The method of claim 7,
wherein the vector-indirect prefetch instruction is a modification of a block store instruction;
wherein the first register, which is normally used to identify a store target location, is repurposed to identify the virtual base address; and
wherein the one or more second registers, which normally hold a block of data to be stored, are repurposed to hold a block of memory containing the plurality of offsets.

9. The method of claim 1, wherein the cache is one of:
a Level 2 (L2) cache;
a Level 3 (L3) cache;
a Level 4 (L4) cache; and
another cache in a memory hierarchy accessed by the processor core.

10. A processor that facilitates prefetching for vector-indirect memory operations, comprising:
a processor core;
a cache in communication with the processor core; and
an execution mechanism within the processor core,
wherein the execution mechanism is configured to,
receive a vector-indirect prefetch instruction, wherein the vector-indirect prefetch instruction specifies a virtual base address, and a plurality of offsets,
perform a single lookup in a translation-lookaside buffer (TLB) using the virtual base address to obtain a physical base address that identifies a physical page for the virtual base address,
send the physical base address and the plurality of offsets to the cache; and
wherein upon receiving the physical base address and the plurality of offsets, the cache is configured to,
add the physical base address from the single lookup to the plurality of offsets to produce a plurality of physical addresses,
for each physical address in the plurality of physical addresses that fall within the physical page, prefetch cache lines for the plurality of physical addresses into the cache; and
for each physical address in the plurality of physical addresses that fall outside of the physical page, no prefetching operation is performed.

11. The processor of claim 10, wherein if the vector-indirect prefetch instruction is a scatter prefetch instruction, the cache prefetches the cache lines into the cache in a modifiable state.

12. The processor of claim 10, wherein if a vector-indirect prefetch instruction causes a cache miss, and a buffer associated with the vector-indirect prefetch instruction is full, the cache drops the vector-indirect prefetch instruction.

13. The processor of claim 10, wherein if the TLB lookup causes a TLB miss, the execution mechanism is configured to:
use a hardware table walker to retrieve an associated page table entry for the virtual base address into the TLB; and
replay the vector-indirect prefetch instruction.

14. The processor of claim 10, wherein the vector-indirect prefetch instruction identifies:
a first register associated with the virtual base address; and
one or more second registers that contain the plurality of offsets.

15. The processor of claim 14,
wherein the vector-indirect prefetch instruction is a modification of a block store instruction;
wherein the first register, which is normally used to identify a store target location, is repurposed to identify the virtual base address; and
wherein the one or more second registers, which normally hold a block of data to be stored, are repurposed to hold a block of memory containing the plurality of offsets.

16. A computer system that facilitates prefetching for vector-indirect memory operations, comprising:
a processor;
a cache associated with the processor;
a memory; and
an execution mechanism within the processor, wherein the execution mechanism is configured to,
receive a vector-indirect prefetch instruction, wherein the vector-indirect prefetch instruction specifies a virtual base address, and a plurality of offsets,
perform a single lookup in a translation-lookaside buffer (TLB) using the virtual base address to obtain a physical base address that identifies a physical page for the virtual base address,
send the physical base address and the plurality of offsets to the cache; and
wherein upon receiving the physical base address and the plurality of offsets, the cache is configured to,
add the physical base address from the single lookup to the plurality of offsets to produce a plurality of physical addresses,
for each physical address in the plurality of physical addresses that fall within the physical page, prefetch cache lines for the plurality of physical addresses into the cache; and
for each physical address in the plurality of physical addresses that fall outside of the physical page, no prefetching operation is performed.

* * * * *